United States Patent
Fujinoki et al.

(10) Patent No.: US 10,511,053 B2
(45) Date of Patent: Dec. 17, 2019

(54) SOLID ELECTROLYTE HAVING MAGNESIUM ION CONDUCTIVITY AND MAGNESIUM SECONDARY BATTERY USING THE SAME

(71) Applicant: Panasonic Intellectual Property Management Co., Ltd., Osaka (JP)

(72) Inventors: Norihito Fujinoki, Osaka (JP); Takuji Tsujita, Osaka (JP); Yu Nishitani, Osaka (JP); Morio Tomiyama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 15/658,320

(22) Filed: Jul. 24, 2017

(65) Prior Publication Data

US 2018/0102567 A1 Apr. 12, 2018

(30) Foreign Application Priority Data

Oct. 12, 2016 (JP) .................. 2016-200538
Dec. 7, 2016 (JP) .................. 2016-237242

(51) Int. Cl.
*H01M 10/056* (2010.01)
*H01M 10/054* (2010.01)

(52) U.S. Cl.
CPC ....... *H01M 10/056* (2013.01); *H01M 10/054* (2013.01); *H01M 2300/0068* (2013.01); *H01M 2300/0094* (2013.01)

(58) Field of Classification Search
CPC .. H01M 4/366; H01M 10/054; H01M 10/056; H01M 10/0562; H01M 2300/0068; H01M 2300/0094
See application file for complete search history.

(56) References Cited

U.S. PATENT DOCUMENTS

2015/0364789 A1 12/2015 Ogawa et al.

FOREIGN PATENT DOCUMENTS

| WO | 2014/119663 | 8/2014 |
| WO | 2016/042594 | 3/2016 |

*Primary Examiner* — Edu E. Enin-Okut
(74) *Attorney, Agent, or Firm* — McDermott Will & Emery LLP (57) ABSTRACT

A solid electrolyte has a composition represented by the formula: $Mg_xSiO_yN_z$, where $1<x<2$, $3<y<5$, and $0 \leq z<1$. The solid electrolyte is an amorphous material.

19 Claims, 5 Drawing Sheets

SOLID ELECTROLYTE HAVING MAGNESIUM ION CONDUCTIVITY AND MAGNESIUM SECONDARY BATTERY USING THE SAME

BACKGROUND

1. Technical Field

The present disclosure relates to a solid electrolyte and a secondary battery including the solid electrolyte.

2. Description of the Related Art

In recent years, magnesium secondary batteries have been expected to be practically applied. Magnesium secondary batteries have high theoretical capacity densities compared to known lithium ion batteries.

International Publication No. WO 2016/042594 discloses a solid electrolyte composed of an oxide containing magnesium, silicon, and aluminum in an olivine structure.

SUMMARY

In one general aspect, the techniques disclosed here feature a solid electrolyte being an amorphous material and having a composition represented by the formula: $Mg_xSiO_yN_z$, where $1<x<2$, $3<y<5$, and $0 \leq z<1$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The Embodiment will now be described in more details using the drawings.

All the descriptions below show comprehensive or specific examples. The numbers, compositions, shapes, film thicknesses, electrical characteristics, structures of secondary batteries, electrode materials, etc. shown below are merely examples and are not intended to limit the present disclosure. The components that are not mentioned in any independent claim describing the broadest concept will be described as optional components.

Solid electrolytes for secondary batteries will now be mainly described, but the use of the solid electrolytes of the present disclosure is not limited thereto. For example, the solid electrolytes may be used for electrochemical devices, such as ion concentration sensors.

EMBODIMENTS

1. Solid Electrolyte

The electrostatic interaction of a divalent magnesium ion with an anion in a solid electrolyte is high compared to that of a monovalent lithium ion. Therefore, magnesium ions are less likely to diffuse in a solid electrolyte. Accordingly, solid electrolytes having magnesium ion conductivity are desired to be improved in ionic conductivity.

In such situations, the present inventor has found the following novel solid electrolyte.

The solid electrolyte according to the Embodiment is an amorphous material and has a composition represented by the formula: $Mg_xSiO_yN_z$, where $1<x<2$, $3<y<5$, and $0 \leq z<1$.

The "solid electrolyte" in this disclosure is not limited to those that strictly satisfy the above-mentioned formula and may contain a trace amount of impurities other than the constitutional elements shown in the formula.

The "amorphous material" in the present disclosure is not limited to materials that have no crystal structure at all and may be a material that includes a crystalline region within the range of short-distance order. The term "amorphous material", for example, refers to a material that does not show a sharp peak derived from a crystal and/or shows a broad peak derived from a noncrystalline material in X-ray diffraction (XRD).

The solid electrolyte according to the Embodiment can show high conductivity of magnesium ions. This is probably caused by the following reasons.

The solid electrolyte according to the Embodiment is constituted of a plurality of layers of coordination polyhedra and magnesium ions disposed between these layers, in the region of short-distance order. The coordination polyhedra are each an octahedron composed of six-coordinated oxygen ions surrounding a silicon atom or an octahedron composed of six-coordinated nitrogen ions or oxygen ions surrounding a silicon atom. Since the solid electrolyte according to the Embodiment has a deficit of the atoms constituting the coordination polyhedron and/or a deficit of magnesium atoms, high conductivity can be shown.

In the formula mentioned above, the composition ratio x of magnesium satisfies $1<x<2$. Consequently, the solid electrolyte can have a deficit of magnesium atoms. This deficit allows magnesium ions to readily move and thereby can increase the conductivity of magnesium ions in the solid electrolyte.

The composition ratio x may further satisfy $1.5<x<2$. In such a case, the solid electrolyte can stabilize the structure and have high stability against a change in temperature. In addition, a sufficiently high carrier density of magnesium ions is secured, imparting high ionic conductivity to the solid electrolyte.

In the formula mentioned above, the composition ratio y of oxygen satisfies $3<y<5$. For example, if the composition ratio y satisfies $3<y<4$, the solid electrolyte can have a deficit of oxygen atoms; and if the composition ratio y satisfies $4<y<5$, the solid electrolyte can have a deficit of magnesium atoms or can include MgO. In any case, the electrostatic attraction of oxygen ions towards magnesium ions is weakened. Consequently, the conductivity of magnesium ions in the solid electrolyte can be increased.

The composition ratio y may further satisfy $3.5<y<4.5$. In such a case, the solid electrolyte can stabilize the structure and have high stability against a change in temperature. In addition, since a sufficient amount of oxygen defects are secured, the solid electrolyte can have excellent ionic conduction characteristics. The composition ratio y may further satisfy $4<y<4.5$. In such a case, the solid electrolyte can further stabilize the structure and have more excellent ionic conduction characteristics.

In the formula mentioned above, the composition ratio z of nitrogen satisfies $0 \leq z < 1$.

If the ratio z satisfies $0 \leq z < 1$, the solid electrolyte contains nitrogen and has a defect generated by binding a silicon atom and a nitrogen atom. This defect weakens the electrostatic attraction to magnesium ions from nitrogen ions. Consequently, the conductivity of magnesium ions in the solid electrolyte can be increased. Furthermore, since the solid electrolyte contains nitrogen, amorphization of the solid electrolyte can be readily suppressed.

The ratio z may further satisfy $0 < z < 0.5$. In such a case, the solid electrolyte can stabilize the structure and have high stability against a change in temperature.

If the ratio z is 0, the solid electrolyte does not contain nitrogen. In this case, the solid electrolyte does not have a defect caused by nitrogen atoms, but the conductivity of magnesium ions in the solid electrolyte can be secured by the above-described deficit of magnesium atoms and/or deficit of oxygen atoms.

The solid electrolyte is constituted of an amorphous material. This enables the distances between the atoms and/or ions constituting the solid electrolyte to be broadened. Consequently, the space where the magnesium ions can move is broadened to reduce the electrostatic attraction from the ions around the magnesium ions. As a result, the solid electrolyte can have excellent ionic conduction characteristics.

Since the solid electrolyte is an amorphous material, it can be made as a thin film. The thickness of the solid electrolyte may be, for example, 100 nm or more and 20 μm or less or further 2 μm or less. In such a case, the resistance value against the conduction of magnesium ions can be reduced while suppressing the occurrence of pinholes in the solid electrolyte. For example, in a solid electrolyte having an ionic conductivity of $2 \times 10^{-7}$ S/cm and a thickness of 100 nm, the resistance value per unit area of the solid electrolyte can be reduced to 50 $\Omega \cdot cm^2$ or less.

2. Method of Producing Solid Electrolyte

The solid electrolyte of the Embodiment can be formed by, for example, a physical deposition method or a chemical deposition method. Examples of the physical deposition method include sputtering, vacuum evaporation, ion plating, and pulsed-laser deposition (PLD). Examples of the chemical deposition method include atomic layer deposition (ALD), chemical vapor deposition (CVD), liquid phase deposition, a sol-gel method, metallo-organic decomposition (MOD), spray pyrolysis deposition (SPD), a doctor blade method, spin coating, and printing techniques. Examples of CVD include plasma CVD, thermal CVD, and laser CVD. The liquid phase deposition is, for example, wet plating, and examples of the wet plating include electric plating, immersion plating, and electroless plating. Examples of the printing techniques include an ink jet method and screen printing. The solid electrolyte is desirably a film that can be formed by sputtering, vacuum evaporation, PLD, or CVD. However, the method of forming a solid electrolyte is not limited to these methods.

The solid electrolyte of the Embodiment can be formed, for example, without annealing. Therefore, the production process can be simplified, the production cost can be reduced, and the yield can be increased.

3. Secondary Battery 3-1. Structure

Figure 1A:
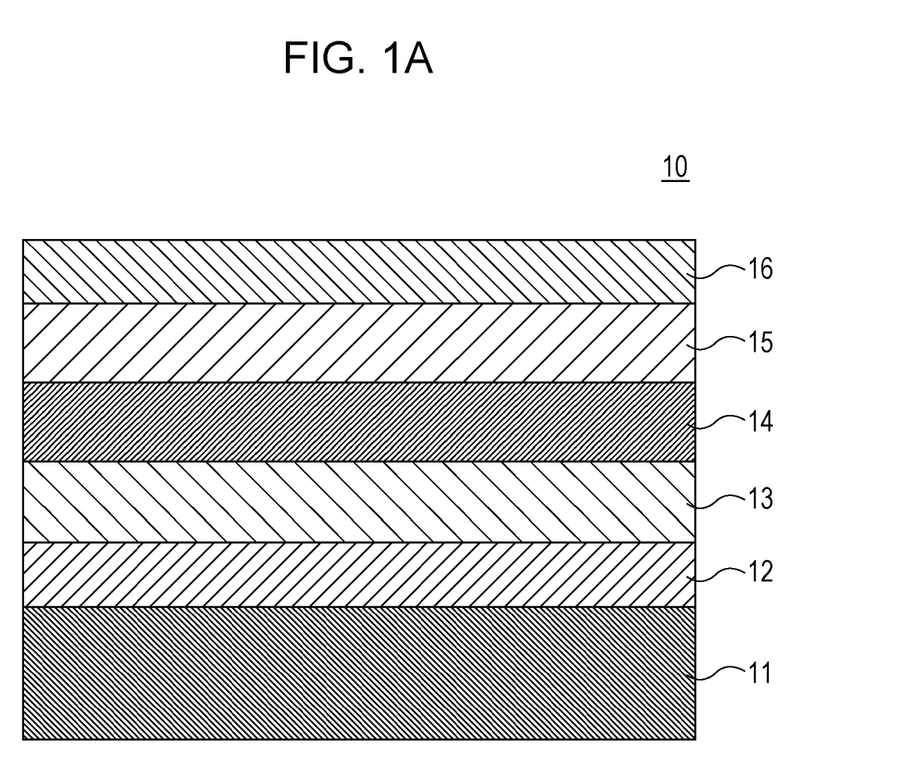
FIG. 1A is a cross-sectional view schematically illustrating a structural example of a secondary battery of an embodiment.

An example of the secondary battery according to an Embodiment will be described using FIG. 1A. FIG. 1A is a cross-sectional view schematically illustrating a structural example of a secondary battery 10 of the Embodiment.

The secondary battery 10 includes a substrate 11, a positive electrode collector 12, a positive electrode 13, a solid electrolyte 14, a negative electrode 15, and a negative electrode collector 16. The solid electrolyte 14 is disposed between the positive electrode 13 and the negative electrode 15, and an intermediate layer may be disposed therebetween. Magnesium ions can move between the positive electrode 13 and the negative electrode 15 through the solid electrolyte 14.

The substrate 11 may be an insulating substrate or may be a conductive substrate. The substrate 11 may be any substrate that does not change when an inorganic material layer or an organic material layer is formed thereon. Examples of the substrate 11 include glass substrate, plastic substrates, polymer films, silicon substrates, metal plates, metal foil sheets, and laminates thereof. The substrate 11 may be a commercially available one or may be produced by a known method.

The positive electrode collector 12 is constituted of an electronic conductor that does not cause a chemical change with the ionic conductor contained in the positive electrode 13, within the operating voltage of the secondary battery 10. The operating voltage of the positive electrode collector 12 against the standard redox potential of magnesium may be, for example, within a range of +2.5 to +4.5 V. The positive electrode collector 12 is made of, for example, a metal or an alloy. More specifically, the positive electrode collector 12 may be made of a metal or alloy containing at least one metal element selected from the group consisting of copper, chromium, nickel, titanium, platinum, gold, aluminum, tungsten, iron, and molybdenum. The positive electrode collector 12 may be made of, for example, aluminum, an aluminum alloy, platinum, or gold, from the viewpoint of electric conductivity, resistance to ionic conductor, and redox potential.

The positive electrode collector 12 may be formed of a transparent conductive film. Examples of the transparent conductive film include films of indium tin oxide (ITO), indium zinc oxide (IZO), fluorine-doped tin oxide (FTO), antimony-doped tin oxide (ATO), indium oxide ($In_2O_3$), tin oxide ($SnO_2$), and Al-containing ZnO.

The positive electrode collector 12 may be a laminated film composed of the above-mentioned metals and/or transparent conductive films.

The positive electrode 13 contains a positive electrode active material that can occlude and release magnesium ions. Examples of the positive electrode active material include metal oxides, polyanion salts, sulfides, chalcogenide compounds, and hydrides. Examples of the metal oxide include transition metal oxides, such as $V_2O_5$, $MnO_2$, and $MoO_3$;

and magnesium complex oxides, such as $MgCoO_2$ and $MgNiO_2$. Examples of the polyanion salt include $MgCoSiO_4$, $MgMnSiO_4$, $MgFeSiO_4$, $MgNiSiO_4$, $MgCo_2O_4$, and $MgMn_2O_4$. Examples of the sulfide include $Mo_6S$. Examples of the chalcogenide compound include $Mo_9Se_{11}$.

The positive electrode active material is, for example, crystalline. The positive electrode 13 may contain two or more positive electrode active materials.

The positive electrode 13 may contain, for example, a conductive material or a binder, as needed.

The conductive material may be any electron-conductive material. Examples of the conductive material include carbon materials, metals, and electroconductive polymers. Examples of the carbon material include graphites, such as natural graphites (e.g., lump graphite and flaky graphite) and artificial graphites; acetylene black; carbon black; Ketchen black; carbon whisker; needle coke; and carbon fibers. Examples of the metal include copper, nickel, aluminum, silver, and gold. These materials may be used alone or in combination of two or more thereof. The conductive material may be, for example, carbon black or acetylene black, from the viewpoint of electron conductivity and coating properties.

The binder may be any material that plays a role of binding active material particles and conductive material particles. Examples of the binder include fluorine-containing resins, such as polytetrafluoroethylene (PTFE), polyvinylidene fluoride (PVdF), and fluororubber; thermoplastic resins, such as polypropylene and polyethylene; ethylene propylene diene monomer (EPDM) rubber; sulfonated EPDM rubber; and natural butyl rubber (NBR). These materials may be used alone or in combination of two or more thereof. The binder may be, for example, a water dispersion of cellulose or styrene-butadiene rubber (SBR).

Examples of the solvents for dispersing the positive electrode active material, the conductive material, and the binder include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The solvent may be, for example, a dispersant containing a thickener. Examples of the thickener include carboxymethyl cellulose and methyl cellulose.

The positive electrode 13 is formed, for example, as follows. First, a positive electrode active material, a conductive material, and a binder are mixed. Subsequently, an appropriate solvent is added to this mixture to prepare a positive electrode material in a paste form. Subsequently, this positive electrode material is applied to the surface of a positive electrode collector, followed by drying. As a result, a positive electrode 13 is prepared. The positive electrode material may be compressed for increasing the electrode density.

The positive electrode 13 may be in a thin film form. The thickness of such a positive electrode 13 may be, for example, 500 nm or more and 20 μm or less.

Since the solid electrolyte 14 is the above-described solid electrolyte, the descriptions thereof are omitted.

The negative electrode 15 may contain a negative electrode active material that can cause magnesium metal or magnesium alloy to be dissolved and deposited on the negative electrode collector 16. Alternatively, the negative electrode 15 may contain a negative electrode active material that can occlude and release magnesium ions. Examples of the negative electrode active material include metals, alloys, sulfides, carbon, organic compounds, inorganic compounds, metal complexes, and organic polymer compounds. Examples of the metal include magnesium, tin, bismuth, and antimony. Examples of the alloy include alloys of magnesium with at least one selected from aluminum, silicon, gallium, zinc, tin, manganese, bismuth, and antimony.

The negative electrode 15 may contain two or more negative electrode active materials.

The negative electrode 15 may contain, for example, a conductive material or a binder, as needed. In the negative electrode 15, the conductive material, the binder, the solvent, and the thickener described in the positive electrode 13 can be appropriately used.

The negative electrode 15 may be in a thin film form. The thickness of such a negative electrode 15 may be, for example, 500 nm or more and 20 μm or less.

The negative electrode collector 16 is constituted of an electronic conductor that does not cause a chemical change with the ionic conductor contained in the negative electrode 15, within the operating voltage of the secondary battery 10. The operating voltage of the negative electrode collector 16 against the standard reduction potential of magnesium may be, for example, within a range of 0 to +1.5 V. In the negative electrode collector 16, the materials described in the positive electrode collector 12 can be appropriately used.

Each of the positive electrode collector 12, the positive electrode 13, the solid electrolyte 14, the negative electrode 15, and the negative electrode collector 16 can be formed by the chemical deposition method or the physical deposition method described above.

The shape of the secondary battery 10 in a top view may be, for example, a rectangle, a circle, an ellipse, or a hexagon. The structure of the secondary battery 10 may be cylindrical, square, button-like, coin-like, or flat.

3-2. First Modification Example

Figure 1B:
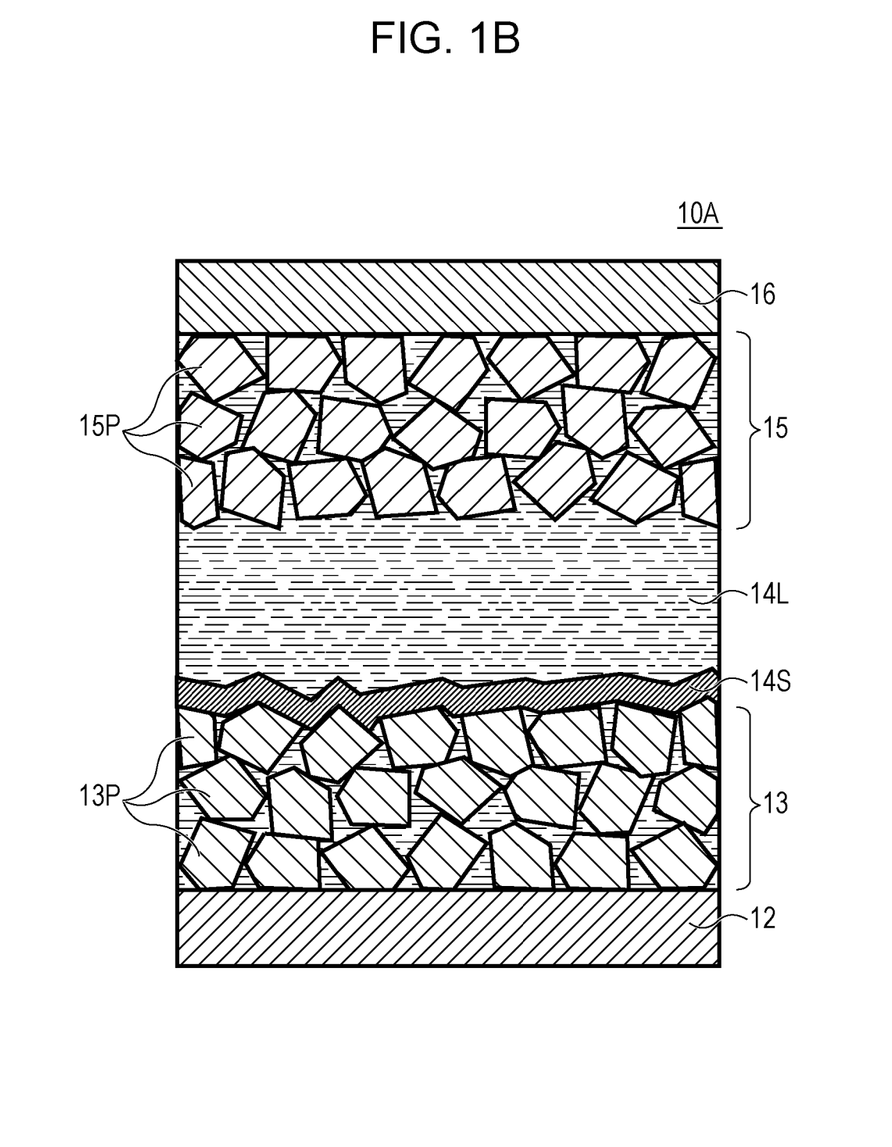
FIG. 1B is a cross-sectional view schematically illustrating a first modification example of the secondary battery of the embodiment.

FIG. 1B is a cross-sectional view schematically illustrating the structure of a secondary battery 10A according to a first modification example of the Embodiment.

The secondary battery 10A includes a positive electrode collector 12, a positive electrode active material layer 13, a negative electrode active material layer 15, a negative electrode collector 16, a electrolytic solution 14L, and a solid electrolyte layer 14S. The secondary battery 10A may further include, for example, a separator (not shown), separating the solid electrolyte layer 14S and the negative electrode active material layer 15. In such a case, the electrolytic solution 14L may be impregnated inside the separator.

The positive electrode active material layer 13 is disposed on the positive electrode collector 12 and contains a plurality of positive electrode active material particles 13P. In other words, a plurality of positive electrode active material particles 13P are disposed on the positive electrode collector 12. The upper surface of the positive electrode active material layer 13 is an irregular surface defined by the positive electrode active material particles 13P. The positive electrode active material layer 12 may contain a conductive material and/or a binder as needed, in addition to the positive electrode active material.

The negative electrode active material layer 15 is disposed on the negative electrode collector 16 and contains a plurality of negative electrode active material particles 15P. In other words, a plurality of negative electrode active material particles 15P are disposed on the negative electrode collector 16. The lower surface of the negative electrode active material layer 15 is an irregular surface defined by the negative electrode active material particles 15P.

The solid electrolyte layer 14S is a single layer disposed on the positive electrode active material layer 13. The solid electrolyte layer 14S collectively covers the positive electrode active material particles 13P. The solid electrolyte layer 14S is formed along the irregular surface defined by the positive electrode active material particles 13P.

The solid electrolyte layer 14S has the same composition as that of the solid electrolyte 14. The solid electrolyte layer 14S is an amorphous material and can therefore be formed as a thin film. This thin film may have a thickness of, for example, 1 nm or more and 200 nm or less. In addition, since the solid electrolyte layer 14S is an amorphous material, the thin film can be easily formed along the irregular surface of the positive electrode active material layer 12.

The electrolytic solution 14L fills the space between the positive electrode active material layer 13 and the negative electrode active material layer 15. The electrolytic solution 14L may further fill the gaps among the positive electrode active material particles 13P and may fill the gaps among the negative electrode active material particles 15P.

The electrolytic solution 14L is a liquid prepared by dissolving a magnesium salt in a nonaqueous solvent and can move magnesium ions depending on the electric field.

Examples of the material of the nonaqueous solvent include cyclic ethers, chain ethers, cyclic carbonates, chain carbonates, cyclic carboxylates, chain carboxylates, pyrocarbonates, phosphates, borates, sulfates, sulfites, cyclic sulfones, chain sulfones, nitriles, and sultones. As the solvent, these materials may be used alone or in combination of two or more thereof.

Examples of the magnesium salt include $MgBr_2$, $MgI_2$, $MgCl_2$, $Mg(AsF_5)_2$, $Mg(ClO_4)_2$, $Mg(PF_2)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(CF_5)_4]_2$, $Mg[B(C_6H_5)_4]_2$, $Mg[N(SOCF_2CF_2CF)_2]_2$, $Mg[BF_3C_2F_5]_2$, and $Mg[PF_3(CF_2CF_3)_3]_2$. As the magnesium salt, these materials may be used alone or in combination of two or more thereof.

In a known secondary battery including an electrolytic solution and not including a solid electrolyte layer, giving and receiving of electrons are performed at the contact surfaces of the positive electrode active material and the electrolytic solution, leading to a risk of decomposing the electrolytic solution. In contrast, since the secondary battery 10A includes a solid electrolyte layer 14S covering a positive electrode active material layer 13, electrons are prevented from moving between the positive electrode active material layer 13 and the electrolytic solution 14L, while permitting magnesium ions to move between the positive electrode active material layer 13 and the electrolytic solution 14L. Accordingly, decomposition of the electrolytic solution 14L can be prevented while maintaining the electrical characteristics of the secondary battery 10A. As a result, the secondary battery 10A is stabilized and can have a long life-span.

The solid electrolyte layer 14S may not completely prevent the contact between the positive electrode active material layer 13 and the electrolytic solution 14L. Even in such case, the solid electrolyte layer 14S enables the contact area between the positive electrode active material layer 13 and the electrolytic solution 14L to be reduced compared to one having a structure not including the solid electrolyte layer 14S.

In particular, during the charging of the secondary battery 10A, if the charging potential of the positive electrode is higher than 4 V, the function of the solid electrolyte layer 14S more efficiently works to prevent the decomposition of the electrolytic solution 14L. For example, a designer can use an electrolytic solution material that has been thought not to be capable of being used in a charging potential range of higher than 4 V as the electrolytic solution 14L of the secondary battery 10A. For example, a designer can employ a nonaqueous solvent that has been used in a known lithium ion secondary battery as the nonaqueous solvent of a high-capacity magnesium secondary battery. Accordingly, the degree of freedom in selection of the material for the secondary battery 10A is increased.

In the secondary battery 10A, the electrolytic solution 14L and the solid electrolyte layer 14S can function as electrolytes. A designer can make the electrolytic solution 14L function as a main component of the electrolyte by, for example, adjusting the distance between the negative electrode active material layer 15 and the solid electrolyte layer 14S and the thickness of the solid electrolyte layer 14S. Consequently, it is possible to realize a secondary battery including an electrolyte having excellent electrical characteristics compared to, for example, a secondary battery of which all of the electrolyte is solid (i.e., all-solid secondary battery).

Figure 1C:
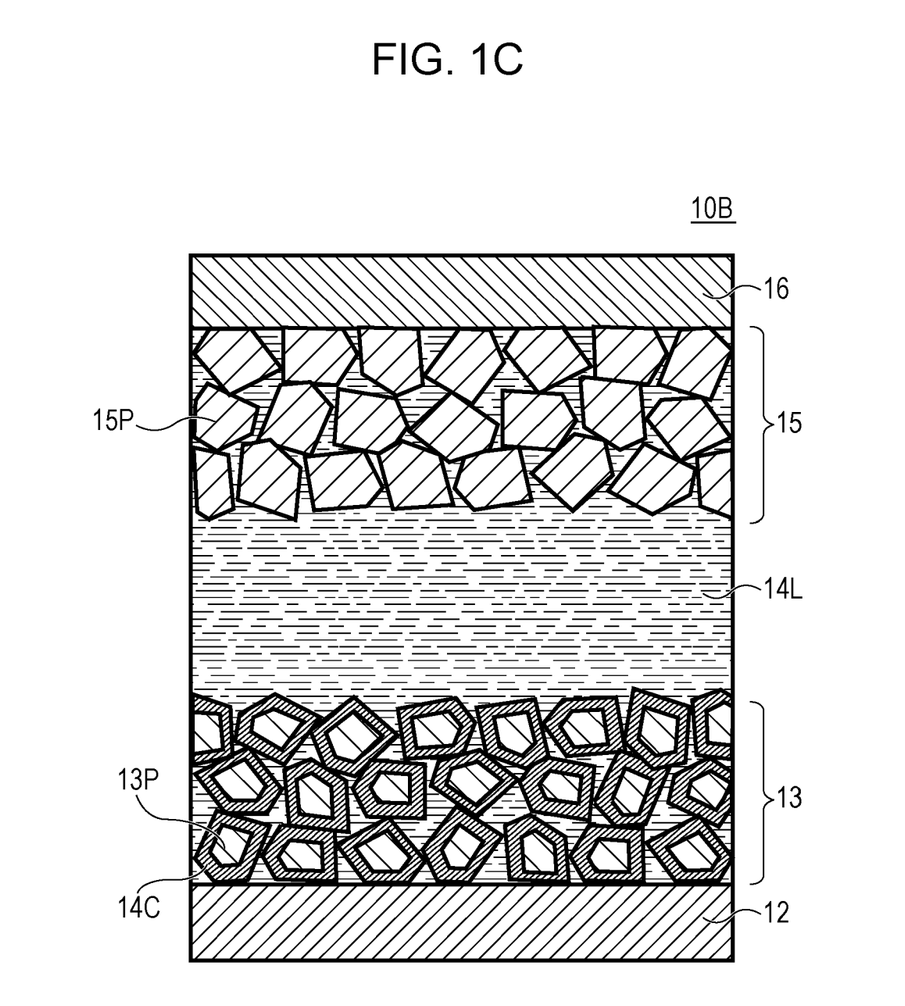
FIG. 1C is a cross-sectional view schematically illustrating a second modification example of the secondary battery of the embodiment.

In the secondary battery 10A, the solid electrolyte layer 14S covers the positive electrode active material layer 13 so as to collectively cover a plurality of positive electrode active material particles 13P. Accordingly, the solid electrolyte layer 14S is easily produced compared to, for example, the solid electrolyte coat 14C described below. In addition, for example, if the positive electrode active material layer 13 contains a conductive material, the solid electrolyte layer 14S can also cover the conductive material, in addition to the positive electrode active material particles 13P. Accordingly, the solid electrolyte layer 14S can also suppress the reaction between the conductive material and the electrolytic solution 14L.

Furthermore, the solid electrolyte layer 14S can prevent occurrence of passive films by covering the positive electrode active material layer 13 and thus can thereby secure stable charge and discharge operation of the secondary battery 10 OA.

3-3. Second Modification Example

FIG. 1C is a cross-sectional view schematically illustrating the structure of a secondary battery 10B according to a second modification example of the Embodiment.

The secondary battery 10B has the same structure as that of the secondary battery 10A except that a solid electrolyte coat 14C is included instead of the solid electrolyte layer 14S.

Each surface of the positive electrode active material particles 13P is covered with the solid electrolyte coat 14C. In other words, the positive electrode active material layer 13 is covered with a solid electrolyte constituted of a plurality of the solid electrolyte coats 14C.

The solid electrolyte coat 14C has the same composition as that of the solid electrolyte 14. The solid electrolyte coat 14C is an amorphous material and can therefore be easily formed along the shape of the positive electrode active material particles 13P to improve the coatability. The solid electrolyte coat 14C may have a thickness of, for example, 1 nm or more and 200 nm or less.

The positive electrode active material layer 13 is formed, for example, as follows. First, the surfaces of positive electrode active material particles 13P are coated with a solid electrolyte to form solid electrolyte coats 14C. Subsequently, the solid electrolyte-coated positive electrode active material particles 13P are mixed with a conductive material and a binder. An appropriate solvent is then added to this mixture to prepare a positive electrode mixture in a paste form. This positive electrode mixture is then applied to the surface of a positive electrode collector 12, followed by drying.

The solid electrolyte coats 14C may be formed by, for example, depositing a solid electrolyte material by the physical deposition method or the chemical deposition method while moving the positive electrode active material particles 13P. Alternatively, the solid electrolyte coats 14C may be formed by, for example, a sol-gel method or the above-described liquid phase deposition.

The secondary battery 10B shows the same effects as the various effects described in the first modification example. Furthermore, in the secondary battery 10B, each of the plurality of the positive electrode active material particles 13P is covered with the solid electrolyte coat 14C. Accordingly, the surfaces of the positive electrode active material particles 13P are not or hardly exposed to the gaps among the positive electrode active material particles 13P. Accordingly, for example, even if these gaps are filled with the electrolytic solution 14L, the oxidative decomposition of the electrolytic solution 14L can be more effectively prevented and/or occurrence of passive films on the positive electrode can be effectively suppressed.

3-4. Other Modification Examples

The structure of the secondary battery according to the Embodiment is not limited to those described above. For example, the secondary battery may include a first solid electrolyte layer collectively covering the positive electrode active material particles and a second solid electrolyte layer collectively covering the negative electrode active material particles. In another example, the secondary battery may include the second solid electrolyte layer, without including the first solid electrolyte layer. In another example, the secondary battery may include first solid electrolyte coats individually covering each of the positive electrode active material particles and second solid electrolyte coats individually covering each of the negative electrode active material particles. In another example, the secondary battery may include the second solid electrolyte coats, without including the first solid electrolyte coats. In another example, at least one of the positive electrodes and the negative electrodes of the secondary battery may be a plate-like metal electrode.

4. Experiments

4-1. Example 1

[4-1-1. Production of Sample]

A plurality of solid electrolyte samples of Example 1 were produced.

A substrate was washed and was then set in a vacuum chamber. The inside of the vacuum chamber was then evacuated to about $2\times10^8$ Pa. Subsequently, a solid electrolyte was formed on the substrate by high-frequency magnetron sputtering using a 4-inch diameter target of $Mg_2SiO_4$. Ar and $O_2$ were used as the sputtering gas at a flow rate of 19.6 sccm and 2.4 sccm, respectively, at a gas pressure of 0.65 Pa. The sputtering power was 200 W (RF). Consequently, a solid electrolyte having a thickness of 590 nm was formed. Silicon, glass, and quartz substrates were used as the substrates of a plurality of samples. These substrates each had a length of 18 mm, a width of 18 mm, and a thickness of 1 mm.

Only in the case of a quartz substrate, platinum electrodes were formed on the top and bottom of a solid electrolyte as follows. Before formation of a solid electrolyte, a platinum electrode was first formed on a substrate using platinum as a target, a stripe-like shadow mask having a width of 1 mm, and Ar as the sputtering gas. The thickness of the platinum electrode was 200 nm. Subsequently, a solid electrolyte was formed under the above-mentioned conditions. Lastly, a platinum electrode was formed on the solid electrolyte by the same procedure as that described above.

[4-1-2. Composition Analysis]

The composition of the solid electrolyte of Example 1 was evaluated by X-ray photoelectron spectroscopy (XPS). Herein, a solid electrolyte formed on a silicon substrate was used as the sample. The element concentration profile in the film depth direction was measured by alternately repeating XPS measurement of the solid electrolyte with an XPS apparatus (Quamtera SXM: manufactured by Ulvac-Phi, Inc.) and Ar sputtering against the solid electrolyte. The measurement results demonstrated that the solid electrolyte of Example 1 had a composition of $Mg_{1.77}SiO_{4.15}$.

[4-1-3. Structure Analysis]

Figure 2:
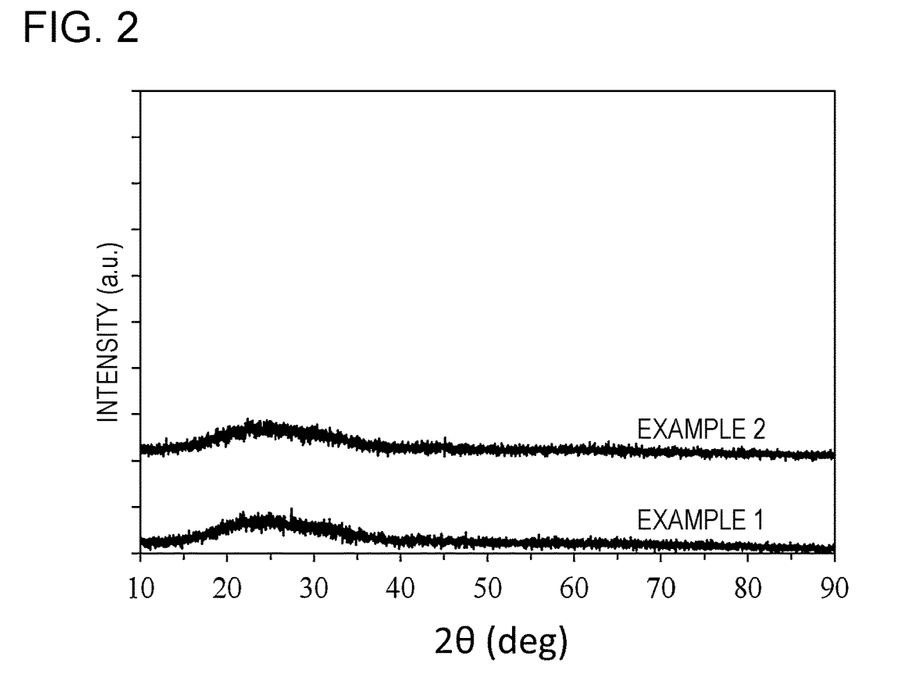
FIG. 2 shows XRD diffraction patterns of the solid electrolytes of Examples 1 and 2.

The crystallinity of the solid electrolyte of Example 1 was evaluated by X-ray diffraction (XRD). Herein, a solid electrolyte formed on a glass substrate was used as the sample. The structure of the sample was analyzed by a wide-angle X-ray diffraction θ–2θ method with an XRD apparatus (SmartLab: manufactured by Rigaku Corporation). As shown in FIG. 2, the solid electrolyte of Example 1 was an amorphous material. The broad peak appearing around a θ of 20° to 30° is derived from the glass substrate.

[4-1-4. Evaluation of Ionic Conductivity]

Figure 4:
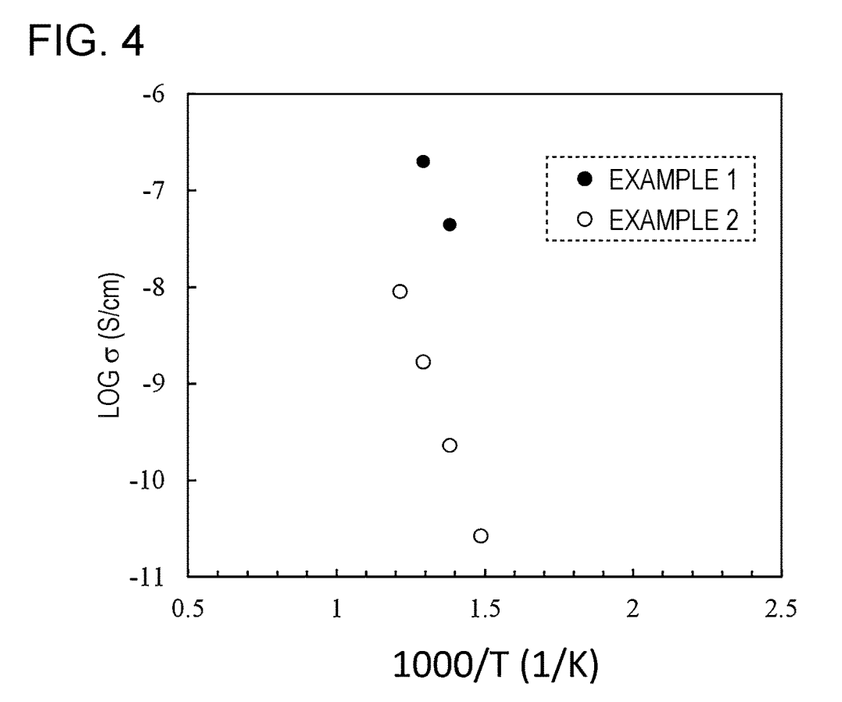
FIG. 4 is a graph showing a relationship between the temperature and the ionic conductivity of each of the solid electrolytes of Examples 1 and 2.

The ionic conductivity of the solid electrolyte of Example 1 was measured by an alternating current impedance method. Herein, a solid electrolyte formed on a quartz substrate was used as the sample. First, the sample was set on the heating stage in a chamber, and the inside of the chamber was purged with a nitrogen atmosphere. The alternating current impedance of the solid electrolyte of the sample was then measured, while changing the temperature of the sample. Specifically, the alternating current impedance of the solid electrolyte was measured with an electrochemical measuring system (Modulab: manufactured by Solartron Analytical) at a frequency range of 0.01 Hz to 1 MHz under an AC bias amplitude of 30 mV. Thus, the resistance value along the normal direction of the main surface of the solid electrolyte layer was measured, and the measured resistance value was converted into ionic conductivity. The relationship between the temperature and the ionic conductivity of the solid electrolyte of Example 1 is shown in FIG. 4. The ionic conductivity of the solid electrolyte of Example 1 was about $2.0\times10^{-7}$ S/cm at 500° C.

4-2. Example 2

[4-2-1. Production of Sample]

A plurality of solid electrolyte samples of Example 2 were produced. The production process was the same as that in Example 1 except that (i) Ar was used as the sputtering gas at a flow rate of 22 sccm, (ii) the gas pressure was 0.13 Pa, and (iii) the sputtering power was 100 W (RF). As a result, a solid electrolyte having a thickness of 520 nm was formed.

[4-2-2. Composition Analysis]

The composition of the solid electrolyte of Example 2 was measured by the same method as that in Example 1. The measurement result demonstrated that the solid electrolyte of Example 2 had a composition of $Mg_{1.42}SiO_{3.67}$.

[4-2-3. Structure Analysis]

The crystallinity of the solid electrolyte of Example 2 was measured by the same method as that in Example 1. As shown in FIG. 2, the solid electrolyte of Example 2 was an amorphous material.

[4-2-4. Evaluation of Ionic Conductivity]

The ionic conductivity of the solid electrolyte of Example 2 was measured by the same method as that in Example 1. The relationship between the temperature and the ionic conductivity of the solid electrolyte of Example 2 is shown in FIG. 4. The ionic conductivity of the solid electrolyte of Example 2 was $1.7 \times 10^{-9}$ S/cm at 500° C.

4-3. Example 3

[4-3-1. Production of Sample]

A plurality of solid electrolyte samples of Example 3 were produced. The production process was the same as that in Example 1 except that (i) $N_2$ was used as the sputtering gas at a flow rate of 22 sccm and (ii) the gas pressure was 2.6 Pa. As a result, a solid electrolyte having a thickness of 400 nm was formed.

[4-3-2. Composition Analysis]

The composition of the solid electrolyte of Example 3 was measured by the same method as that in Example 1. The measurement result demonstrated that the solid electrolyte of Example 3 had a composition of $Mg_{1.87}SiO_{4.03}N_{0.06}$.

[4-3-3. Structure Analysis]

Figure 3:
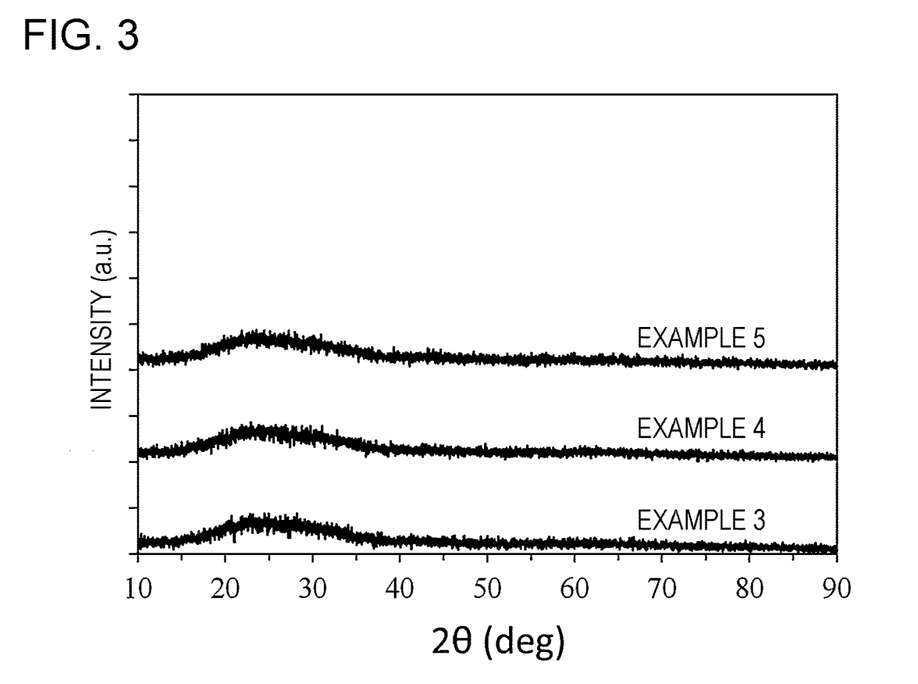
FIG. 3 shows XRD diffraction patterns of the solid electrolytes of Examples 3 to 5.

The crystallinity of the solid electrolyte of Example 3 was measured by the same method as that in Example 1. As shown in FIG. 3, the solid electrolyte of Example 3 was an amorphous material.

[4-3-4. Evaluation of Ionic Conductivity]

Figure 5:
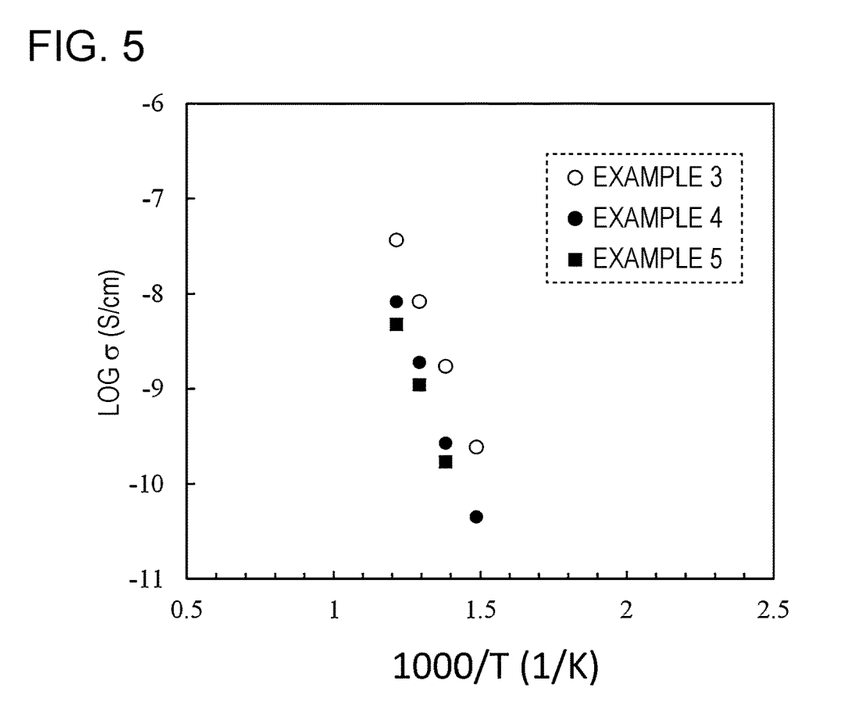
FIG. 5 is a graph showing a relationship between the temperature and the ionic conductivity of each of the solid electrolytes of Examples 3 to 5.

The ionic conductivity of the solid electrolyte of Example 3 was measured by the same method as that in Example 1. The relationship between the temperature and the ionic conductivity of the solid electrolyte of Example 3 is shown in FIG. 5. The ionic conductivity of the solid electrolyte of Example 3 was $8.3 \times 10^{-9}$ S/cm at 500° C.

4-4. Example 4

[4-4-1. Production of Sample]

A plurality of solid electrolyte samples of Example 4 were produced. The production process was the same as that in Example 1 except that (i) $N_2$ was used as the sputtering gas at a flow rate of 22 sccm and (ii) the gas pressure was 0.65 Pa. As a result, a solid electrolyte having a thickness of 590 nm was formed.

[4-4-2. Composition Analysis]

The composition of the solid electrolyte of Example 4 was measured by the same method as that in Example 1. The measurement result demonstrated that the solid electrolyte of Example 4 had a composition of $Mg_{1.84}SiO_{3.82}N_{0.14}$.

[4-4-3. Structure Analysis]

The crystallinity of the solid electrolyte of Example 4 was measured by the same method as that in Example 1. As shown in FIG. 3, the solid electrolyte of Example 4 was an amorphous material.

[4-4-4. Evaluation of Ionic Conductivity]

The ionic conductivity of the solid electrolyte of Example 4 was measured by the same method as that in Example 1. The relationship between the temperature and the ionic conductivity of the solid electrolyte of Example 4 is shown in FIG. 5. The ionic conductivity of the solid electrolyte of Example 4 was $1.9 \times 10^{-9}$ S/cm at 500° C.

4-5. Example 5

[4-5-1. Production of Sample]

A plurality of solid electrolyte samples of Example 5 were produced. The production process was the same as that in Example 1 except that (i) $N_2$ was used as the sputtering gas at a flow rate of 22 sccm and (ii) the gas pressure was 0.13 Pa. As a result, a solid electrolyte having a thickness of 510 nm was formed.

[4-5-2. Composition Analysis]

The composition of the solid electrolyte of Example 5 was measured by the same method as that in Example 1. The measurement result demonstrated that the solid electrolyte of Example 5 had a composition of $Mg_{1.69}SiO_{3.37}N_{0.40}$.

[4-5-3. Structure Analysis]

The crystallinity of the solid electrolyte of Example 5 was measured by the same method as that in Example 1. As shown in FIG. 3, the solid electrolyte of Example 5 was an amorphous material.

[4-5-4. Evaluation of Ionic Conductivity]

The ionic conductivity of the solid electrolyte of Example 5 was measured by the same method as that in Example 1. The relationship between the temperature and the ionic conductivity of the solid electrolyte of Example 5 is shown in FIG. 5. The ionic conductivity of the solid electrolyte of Example 5 was $1.1 \times 10^{-9}$ S/cm at 500° C.

5. Supplement

The present disclosure is not limited to the above-described Embodiments and Examples and can be variously modified or changed within the scopes of the claims. For example, the technical characteristics described in the Embodiment and/or Examples can be appropriately exchanged or combined.

What is claimed is:

1. A solid electrolyte:
    having a composition represented by a formula: $Mg_xSiO_yN_z$, where $1<x<2$, $3<y<5$, and $0 \leq z<1$; and
    being an amorphous material.
2. The solid electrolyte according to claim 1, wherein z satisfies $0 \leq z<1$.
3. The solid electrolyte according to claim 1, wherein z is 0.
4. The solid electrolyte according to claim 1, wherein x satisfies $1.5<x<2$.
5. The solid electrolyte according to claim 1, wherein y satisfies $3.5<y<4.5$.
6. The solid electrolyte according to claim 2, wherein z satisfies $0<z<0.5$.
7. The solid electrolyte according to claim 1, wherein the solid electrolyte is a film having a thickness of 100 nm or more and 20 μm or less.
8. A secondary battery comprising:
    a positive electrode containing a positive electrode active material;
    a negative electrode containing a negative electrode active material; and
    the solid electrolyte according to claim 1.
9. The secondary battery according to claim 8, wherein z satisfies $0<z<1$.

10. The secondary battery according to claim 8, wherein z is 0.

11. The secondary battery according to claim 8, wherein x satisfies $1.5<x<2$.

12. The secondary battery according to claim 8, wherein y satisfies $3.5<y<4.5$.

13. The secondary battery according to claim 9, wherein z satisfies $0<z<0.5$.

14. The secondary battery according to claim 8, wherein the solid electrolyte is a film having a thickness of 100 nm or more and 20 μm or less.

15. The secondary battery according to claim 8, wherein the positive electrode, the solid electrolyte, and the negative electrode are stacked.

16. The secondary battery according to claim 8, further comprising:
- an electrolytic solution filling the space between the positive electrode and the negative electrode and containing a nonaqueous solvent and a magnesium salt dissolved in the nonaqueous solvent, wherein
- the solid electrolyte covers the positive electrode.

17. The secondary battery according to claim 16, wherein
- the positive electrode includes a positive electrode active material layer containing a plurality of positive electrode active material particles; and
- the solid electrolyte is disposed as a single layer collectively covering the plurality of the positive electrode active material particles.

18. The secondary battery according to claim 17, wherein
- the positive electrode active material layer has an irregular surface defined by the plurality of the positive electrode active material particles; and
- the solid electrolyte is disposed along the irregular surface.

19. The secondary battery according to claim 16, wherein
- the positive electrode includes a positive electrode active material layer containing a plurality of positive electrode active material particles; and
- the solid electrolyte is composed of a plurality of coats individually covering the plurality of the positive electrode active material particles.

* * * * *